(12) United States Patent
Bergmann et al.

(10) Patent No.: US 6,249,619 B1
(45) Date of Patent: Jun. 19, 2001

(54) OPTICAL ISOLATOR

(75) Inventors: Ernest Eisenhardt Bergmann, Fountain Hill Borough, Lehigh County, PA (US); Gustav Edward Derkits, Jr., New Providence, NJ (US); Ralph Stephen Jameson, Allentown, PA (US)

(73) Assignee: Agere Systems Optoelectronics Guardian Corp., Miami Lakes, FL (US)

( * ) Notice: Subject to any disclaimer, the term of this patent is extended or adjusted under 35 U.S.C. 154(b) by 0 days.

(21) Appl. No.: 09/156,162

(22) Filed: Sep. 17, 1998

(51) Int. Cl.[7] .................................. G02F 1/09; G02B 5/30
(52) U.S. Cl. ........................... 385/11; 359/495; 372/703
(58) Field of Search .......................... 385/11; 372/703; 359/494, 495, 500

(56) References Cited

U.S. PATENT DOCUMENTS

| | | | |
|---|---|---|---|
| 5,033,830 | * 7/1991 | Jameson | 359/484 |
| 5,299,056 | * 3/1994 | Kurata et al. | 359/341 |
| 5,627,923 | * 5/1997 | Kakizaki | 385/14 |
| 5,706,371 | * 1/1998 | Pan | 385/11 |
| 5,913,002 | * 6/1999 | Jiang | 385/88 |
| 6,075,642 | * 6/2000 | Chang | 359/261 |
| 6,081,635 | * 6/2000 | Hehmann | 385/24 |

* cited by examiner

*Primary Examiner*—Rodney Bovernick
*Assistant Examiner*—Michael J. Stahl
(74) *Attorney, Agent, or Firm*—Lowenstein Sandler PC

(57) ABSTRACT

An optical isolator which is suitable for array assembly and may be produced by lithographically-defined means comprises a sandwich of layers. These layers include a substrate having two waveguides for transmission of a signal having two parts, each part being comprised of two rays; a walk-off plate for spatially displacing or recombining the rays of both parts; a half-wave plate of birefringent material for reciprocal rotation of the polarization of the rays of only one part of the signal; a non-reciprocal rotator for rotating the polarization of the rays of both parts of the signal at a predetermined angle; a lens for collimating the rays transmitted through the walk-off plate, the half-wave plate, and the rotator, and for focusing the rays opposite the rotator at a common region along an end surface; and an end surface for interconnection of the rays of the two parts of the signal.

18 Claims, 8 Drawing Sheets

OPTICAL ISOLATOR

FIELD OF THE INVENTION

The present invention relates to an optical isolator which is suitable for array assembly and may be produced by lithographically-defined means. The invention further embraces an optical communications system comprising such an optical isolator.

BACKGROUND OF THE INVENTION

Optical isolators are devices used in fiber optic transmission systems. They are important devices in high-speed systems including optical communications systems because they block light from traveling in the wrong direction through the fiber, i.e., they block back reflections. Back reflections may occur within a fiber when the transmitted light hits a point of discontinuity. Discontinuities may occur for a number of reasons, such as when there is a change in the refractive indices of interfacing materials, perturbations along the transmission path, or misalignment of the cores of optical fibers being connected. Back reflections present a serious problem in optical fiber systems as they introduce undesirable noise components into the signal, degrade performance, and can corrupt the transmission source, which typically is a laser.

A prior art optical isolator device is schematically illustrated in FIG. 1, comprising a pair of polarizers 12, 22, and a Faraday rotator 14. Light travels in the forward direction from optical fiber 8 having an input port 10, through the first polarizer 12, the rotator 14, and the second polarizer 22, following arrows "F" of FIG. 1. Light leaves the optical fiber 8 unpolarized or with an arbitrary polarization, exemplified by encircled arrow 10a. After passing through the first polarizer 12, the light becomes polarized specifically, the first polarizer blocking light of horizontal polarization and transmitting vertically polarized light (exemplified by the encircled arrow 12a). The vertically polarized light then enters the Faraday rotator 14. With the rotator, the polarization is rotated 45 degrees, shown here in the clockwise direction, exemplified by encircled arrow 14a. A Faraday rotator 14 typically is fabricated with a plate of yttrium iron garnet (YIG) crystal surrounded by a magnet for applying a magnetic field and making the crystal optically active. Upon exiting the rotator, the light then travels straight through the second polarizer 22 (also called the "analyzer"), which is orientated at a 45 degree angle to the first, with essentially no losses (e.g., 22a). The transmitted light exits to the output port 20, and onto other parts of the optical communications system. For simplicity, a focusing means used in the device of FIG. 1 is not shown.

With this isolator, light will not be back reflected to input port 10 because when the light is polarized in the same way in the reverse direction, it will not be transmitted through the first polarizer 12. In particular, light traveling in the backward direction, following arrows B, will exit fiber 20 unpolarized (e.g., 20a). Light passes through the second polarizer 22 at a 45° angle (e.g., 22b), and then it will pass through the Faraday rotator 14, which rotates the light by another 45 degrees (e.g., 14b). The Faraday rotator is a non-reciprocal rotating device, such that the light passing through it in the reverse direction is rotated in the same (here clockwise) direction as light passing through it in the forward direction. Thus, when traveling in reverse, the light leaving the Faraday rotator is rotated 90 degrees relative to the vertical transmission path of the first polarizer 12 (hence it is horizontally polarized) and is therefore blocked, since the first polarizer transmits only vertically polarized light. Thus, the optical isolator 10 allows light traveling in the forward direction and having a specific polarization to be transmitted but blocks all polarizations of light traveling in the reverse direction.

As can be seen, these traditional isolators are polarization-selective. However, the transmission system itself may cause uncontrollable changes in polarization, thereby altering the polarization of the light entering the system and reducing the utility of these isolators. Thus, efforts have been made to develop polarization-independent optical isolators. These efforts have concentrated on using birefringent media in place of the polarizers to split the light signal into two orthogonally-polarized light paths. With these devices, the light is passed through two birefringent plates. In the forward direction, the light rays are split by one plate and then recombined by the second plate; however, in the reverse direction, the light rays after being split by the first plate are either not recombined or are further split by the second plate, so that the rays are physically separated. The separation of the rays causes the signal to be intercepted. See, e.g., U.S. Pat. No. 5,033,830, issued Jul. 23, 1991 to Jameson, titled "Polarization Independent Optical Isolator," assigned to the assignee herein, which is hereby incorporated by reference; and U.S. Pat. No. 5,044,713, issued Sept. 3, 1991 to Mozer, et al., titled "Optical Isolator," incorporated herein by reference.

A difficulty with these isolators is that the thicknesses of the birefringent plates may need to be precisely controlled; that is, the thicknesses of the two plates must be essentially identical because any difference will affect the accuracy of alignment of the two light paths relative to one another. This has been addressed by using a single birefringent plate with a reflecting means, as in the Jameson patent, so that the same plate both splits and recombines the signal.

A few designs exist for reflexive isolators, as in the Jameson patent. With these designs, the input and output waveguides are on the same side of the device; light emerging from one port is redirected by a reflector back into the end of another fiber on the same side. Another approach in addressing difficulties related to the thicknesses of birefringent plates is to use an electric field to control the refractive index of the birefringent medium, e.g., polymethyl methacrylate (PMMA), U.S. Pat. No. 5,191,467 issued to Kapany et al. titled "Fiber Optic Isolator and Amplifier" (hereinafter the "Kapany patent"), incorporated herein by reference.

As may be appreciated, those concerned with the development of optical communications systems continually search for new components and designs, including new designs for polarization-independent optical isolators. As optical communications systems become more advanced, there is growing interest in improving devices for optical circuits and for integrating them. The instant invention provides a new structure for a polarization-independent isolator which may be used as a reflexive isolator or to couple integrated optical circuits. Further advantages may appear more fully upon considering the description given below.

SUMMARY OF THE INVENTION

Summarily described, the invention embraces an optical isolator for blocking back reflection in a signal having two parts, the isolator comprising a walk-off plate for spatially displacing or recombining the paths of the two parts of the signal; a half-wave plate for changing the polarization of the paths of only one part of the signal; a non-reciprocal rotator for rotating the paths of both parts of the signal at a predetermined angle; and a lens-containing layer having an end surface for interconnection of the paths of both parts, the lens-containing layer also having a lens between the rotator and the end surface for collimating the paths and for focusing the paths at a common region along the end surface. Preferably, the isolator comprises a sandwich of layers that may be produced by lithographically defined means. The end surface may be coated to define a highly-reflective surface so that one part of the signal is reflected in a backward direction to the other part of the signal, or it may be coated to provide an anti-reflective surface so that one part of the signal is transmitted in a forward direction to the other part of the signal. The isolator may be coupled to a substantially duplicate assembly and may form an array.

BRIEF DESCRIPTION OF THE DRAWINGS

For a better understanding of the invention, an exemplary embodiment is described below, considered together with the accompanying drawings, in which.

It is to be understood that these drawings are for the purposes of illustrating the concepts of the invention and are not to scale.

DETAILED DESCRIPTION OF THE INVENTION

Figure 2A:
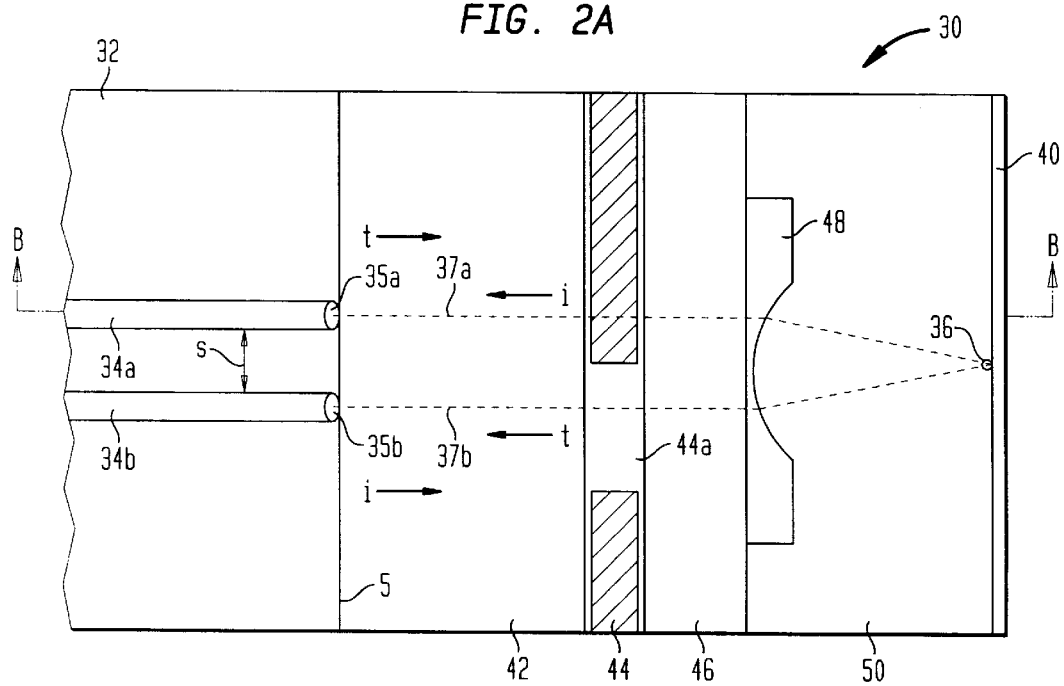
FIG. 2A is a schematic illustration of a top view of one embodiment of the inventive optical isolator.
Figure 2B:
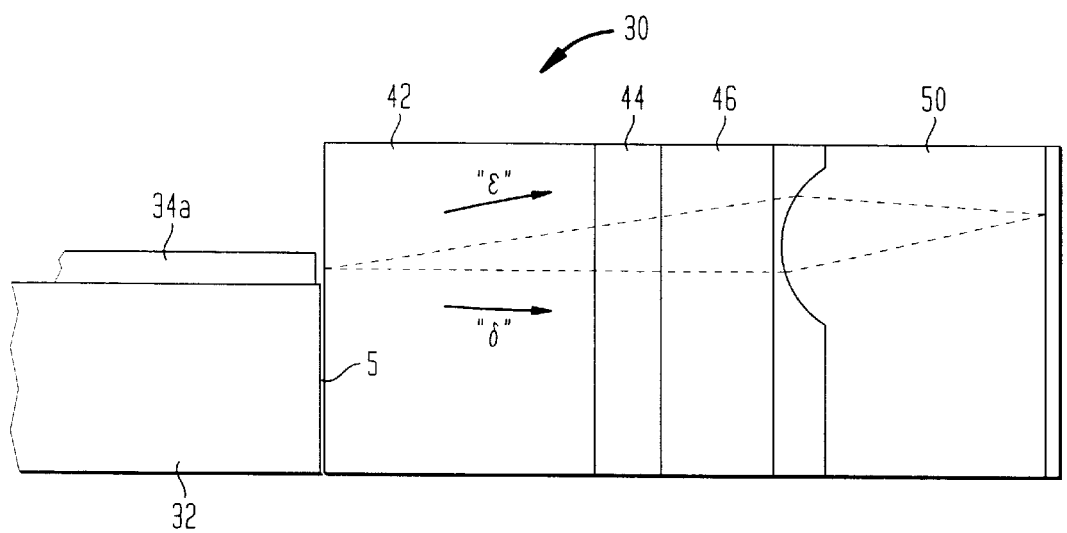
FIG. 2B is a schematic illustration of a side view of the isolator of FIG. 2A.

Referring to FIGS. 2A and 2B, there are shown schematic illustrations of one embodiment of the inventive optical isolator 30, wherein FIG. 2A shows a top view and FIG. 2B a cross-sectional side view taken along the line B—B of FIG. 2A. In this embodiment, a signal path defined by two parts of the signal denoted as a first part 37a and a second part 37b associated with first and second waveguides 34a, 34b, respectively, is transmitted through the device. The isolator is defined herein as comprising the features to the right of the interface 5, but it is anticipated that the isolator will be used in combination with the waveguides or other device for emitting a signal such as a dual termination device comprising optical glass fibers retained in a ceramic or glass capillary. First and second waveguides 34a, 34b may in effect consist of a length of fiber for transmission of a signal from an input port 35a to an output port 35b, the optical rays traced from these two waveguides intersecting at a common region 36 of reflection along an interconnection surface 40; the signal is defined as having two parts comprising a first part 37a and second part 37b, associated with the first and second waveguides, for ease of description of the invention. In this embodiment, the surface 40 is given a high-reflectivity coating. However, as will be further discussed below, the two waveguides 34a, 34b, may comprise a pair of optical fibers that are coupled via isolator structures to another optical circuit or circuits. In that case, instead of the high-reflectivity (HR) coating, an anti-reflectivity (AR) coating may be used on the interconnection surface 40, so that the signal transmitted from the section of fiber 34a at inlet port 35a may pass through surface 40 without loss and be coupled to a substantially duplicate assembly (see FIG. 4). The invention will first be described with reference to the embodiment of FIGS. 2A–2B, where the HR coating is used.

Referring to FIGS. 2A–2B, the isolator may comprise a "sandwich of layers" with each layer containing optical elements. The isolator may be placed against a substrate 32 containing waveguides or proximate a dual termination. The dual termination position may be fixed by the package or glued (e.g., epoxied) to the interface 5. The sandwich comprises a walk-off or birefringent plate 42; a half-wave plate 44 having a gap 44a; a non-reciprocal rotation device 46 such as a Faraday rotator; and a lens-containing layer 50 comprising a lens 48 and an end surface 40. The end surface 40, which may comprise the edge surface of the lens containing layer 50, may have an AR or HR coating for transmission or reflection of light paths, respectively. "Sandwich of layers" as used herein means the elements (the walk-off plate 42, half-wave plate 44, rotator 46 and lens layer 50) are placed essentially side-by-side, and typically, these elements will be bonded together so there are virtually no spaces between them; however, it should be understood that the term "sandwich of layers" includes a structure where spaces are present between the layers. When constructed as a sandwich of layers, the "sandwich" can be diced into smaller pieces or sheets such that each smaller sheet will contain one or more isolators.

As seen in FIGS. 2A and 2B, optical waveguides 34a, 34b are disposed on the first layer or substrate 32 parallel to each other, with a typical separation "s" on the order of about 0.05 to 0.15 mm, for transmission of the signal 37a, 37b, via input port 35a and output port 35b. The waveguides may comprise a dual termination device, a pair of closely-spaced fibers, or two planar waveguides created on a substrate 32 using techniques well known to those skilled in the field of making integrated optical circuits. The isolator 30 comprises, in the path of the signal transmitted by the waveguides, a first slab of birefringent material 42, with its optical axis neither parallel nor perpendicular to the normal to its surface. Many birefringent materials may be used to fabricate this plate, but a preferred material comprises a uniaxial material which may include calcite or rutile. The preferred direction of the optical axis along the birefringent material is from about 40 degrees to 50 degrees displaced from the vertical plane of the surface. This slab of birefringent material 42 also may be referred to as the "walkoff plate," as the phenomenon of spatial displacement created by this slab is often referred to as "walkoff."

In FIG. 2A, the principal signal leaving ports 35a, 35b of the fibers is shown as traveling along one straight line, e.g., directly to the right in the figure, parallel with the normal to the surface of the birefringent slab 42. In actuality, the signal upon leaving each waveguide and entering the birefringent slab 42 will be split into two paths, the ordinary ray ("O-ray") and the extraordinary ray ("E-ray"), as seen in FIG. 2B. The two paths are not shown in FIG. 2A for ease of description which gives a top view, although FIG. 2B, which gives a cross-sectional side view, shows the two light paths. The separate treatment into ordinary and extraordinary rays is related to the optical polarization of the light. As is known for birefringent materials, the ordinary ray will behave as expected according to Snell's law and will emerge from the birefringent medium in the same direction or path as the point of entry. The extraordinary ray, however, does not obey Snell's law and will emerge with its path shifted laterally but also in the same direction as before entry. (See, e.g., FIG. 3A).

As shown in FIGS. 2A and 2B, adjacent the birefringent slab 42 along the transmission path of the signal is next disposed a half wave plate 44. A half-wave plate delays one polarization relative to the other polarization "half a wave" so that the phase between the two polarization components change by a factor of −1. A delay of three-halves, five-halves, seven-halves, etc., may be used as it is easier to make a thicker plate. Two nearly compensated plates may also be used; for example, the first plate may produce a delay of D waves and the second a delay of −D+½ waves so together the net polarization differential delay is ½ wave. Since one is often interested in minimizing wavelength sensitivity (different light signals have slightly different wavelengths), the wavelength dependence for a ½ wave plate is better than a three-halves or five-halve, etc., plate. Among the many materials that may be used to fabricate this plate, a preferred material is quartz, mica, or other birefringent material having a fast (or slow) direction at 22½° to the polarization of the ordinary polarization of the birefringent slab 42. The plate 44 has holes etched within it so as to define at least one gap 44a, whereby light beams (e.g., 37b), of one part of the signal associated with one waveguide (e.g., 34b), will pass through the gap 44a, and light beams (37a) of the other part of the signal associated with the other waveguide (34a), will pass through the one-half wave plate which functions to change the polarization of both rays (the O-ray and E-ray). Preferably, the polarization is changed by an angle of about 45.° The half-wave plate is generally much thinner than the birefringent plate 42; for example, when crystalline quartz is used for the half-wave plate, a preferred thickness for the plate is about from 0.04 to 0.06 mm, and more preferably about 0.05 mm, for transmission of radiation in the near infrared region.

Next, adjacent the half-wave plate 44 along the path of the signals 37a, 37b, there is a non-reciprocal rotator 46. For the remainder of this discussion, the non-reciprocal rotator 46 will be referred to as a "Faraday rotator," designed to perform rotation of the polarization by 22½° when the signal is passed through it in either the forward or reverse directions, which may of course involve a clockwise or counterclockwise rotation. When the optical isolator is used for transmission of infrared radiation (e.g., wavelengths of longer than 700 nm and preferably at about 1100–1600 nm), a preferred material for making the Faraday rotator is suitably-doped garnet (e.g., garnet doped with yttrium, yttrium-iron, or other dopants known in the field or being developed for such devices). Depending on the materials used to fabricate the Faraday rotator, a magnetic field may have to be externally supplied so the Faraday rotation occurs; however, different types of garnet materials such as those referred to as "latched" garnet are being developed which act as if they are permanently magnetized internally, thus avoiding the need for the externally-applied field. In any case, depending on the type of material used and the temperature and wavelength of the light transmitted, the thickness of the Faraday rotator 46 may be varied to produce the desired rotation (e.g., 22½°), in each pass applying principles known in the field.

Adjacent the Faraday rotator 46 along the transmission path of the signals 37a, 37b, there is next disposed a lens-containing layer 50, having lens 48 and an end or interconnection surface 40. The lens 48 functions to focus the beams (including both the ordinary and extraordinary rays), at one common region 36 along the interconnection surface 40. Also, the lens will collimate the beams which would begin to spread with distance as they travel through the isolator, i.e., through the slab 42, half-wave plate 44, and Faraday rotator 46. The interconnection surface 40 is in this embodiment HR coated to provide reflection (and hence interconnection), between the parts of the signal 37a, 37b, associated with the two waveguides 34a, 34b. The optical coatings may consist of a series of thin layers of high and low index of refraction materials. The materials used for the coating may be individually transparent and yet the total sum of the layers may result in reflectivities of greater than ninety-nine percent. Gold provides good reflection in the infra-red region; it can be applied in layers of varying thicknesses.

With this configuration, light travels through the device and is polarized differently in the forward (transmission) and reverse (isolation) directions, such directions being designated with arrows "t" and "i" of FIG. 2A. In the forward or transmission direction "t", the ordinary and extraordinary polarizations become interchanged as between the entry of the signal 37a to the half-wave plate 44 and the re-entry of the signal 37b to the birefringent slab or walkoff plate 42. However, in the reverse or isolation direction "i," the polarizations are not interchanged, that is, the O-ray is still oriented in the ordinary polarization, and the E-ray in the extraordinary polarization, so that they are spatially displaced by slab 42 to miss the input port 35a of the first fiber 34a. (See FIG. 3B, position "M.")

Figure 1:
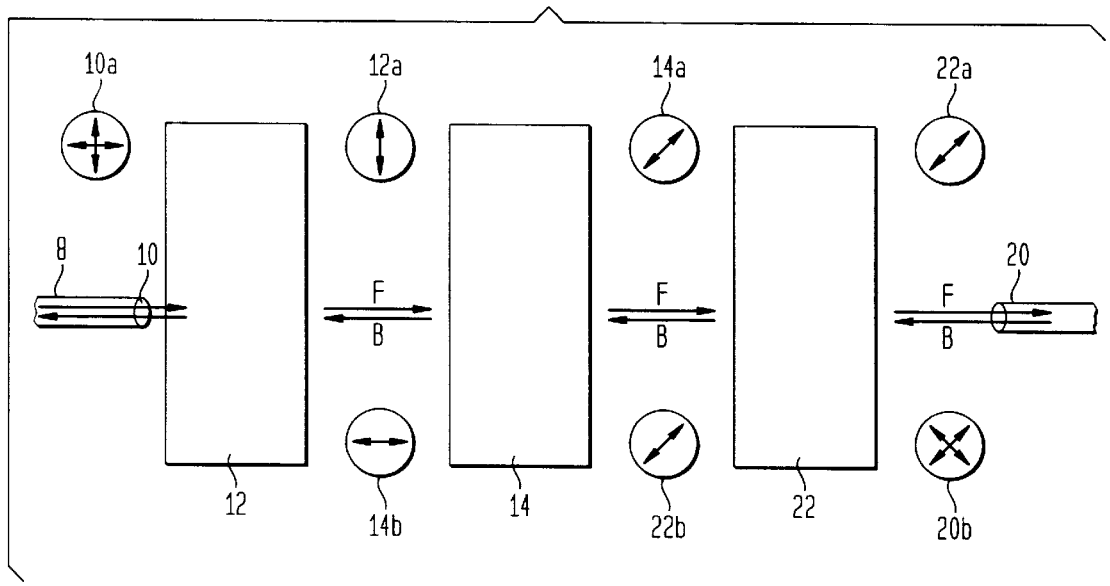
FIG. 1 is a schematic illustration of a prior art optical isolator.

Good polarization-independent coupling is thereby achieved in the transmission direction, yet poor coupling results in the reverse, isolation direction, providing a useful optical isolator. (Notably, as used herein, "the transmission direction" is not necessarily from left to right in these figures, as at the second part of the signal 37b, the transmission direction is from right to left. As used herein, when it is said the signal passes through a plate or slab in a first direction versus a second direction, these terms are intended to refer to the passing of the signal from left to right or from right to left, not the passing of the signal in the transmission or isolation directions.) Two measures of polarization independent performance are polarization dependent loss ("PDL") and polarization mode dispersion ("PMD"). PDL measures if the loss is comparable for both (all) polarizations, and PMD measures whether the optical path lengths match for both polarizations. In prior art devices such as that shown in FIG. 1, the PDL is very poor. Generally, PMD deteriorates in the passage through a walk-off plate because the two polarizations experience not only different paths but also different indices of refraction. In the preferred embodiment here, the PMD is very good because each path has equal amounts of "F" and "O" paths in the complete traversal of the device.

Figure 3A:
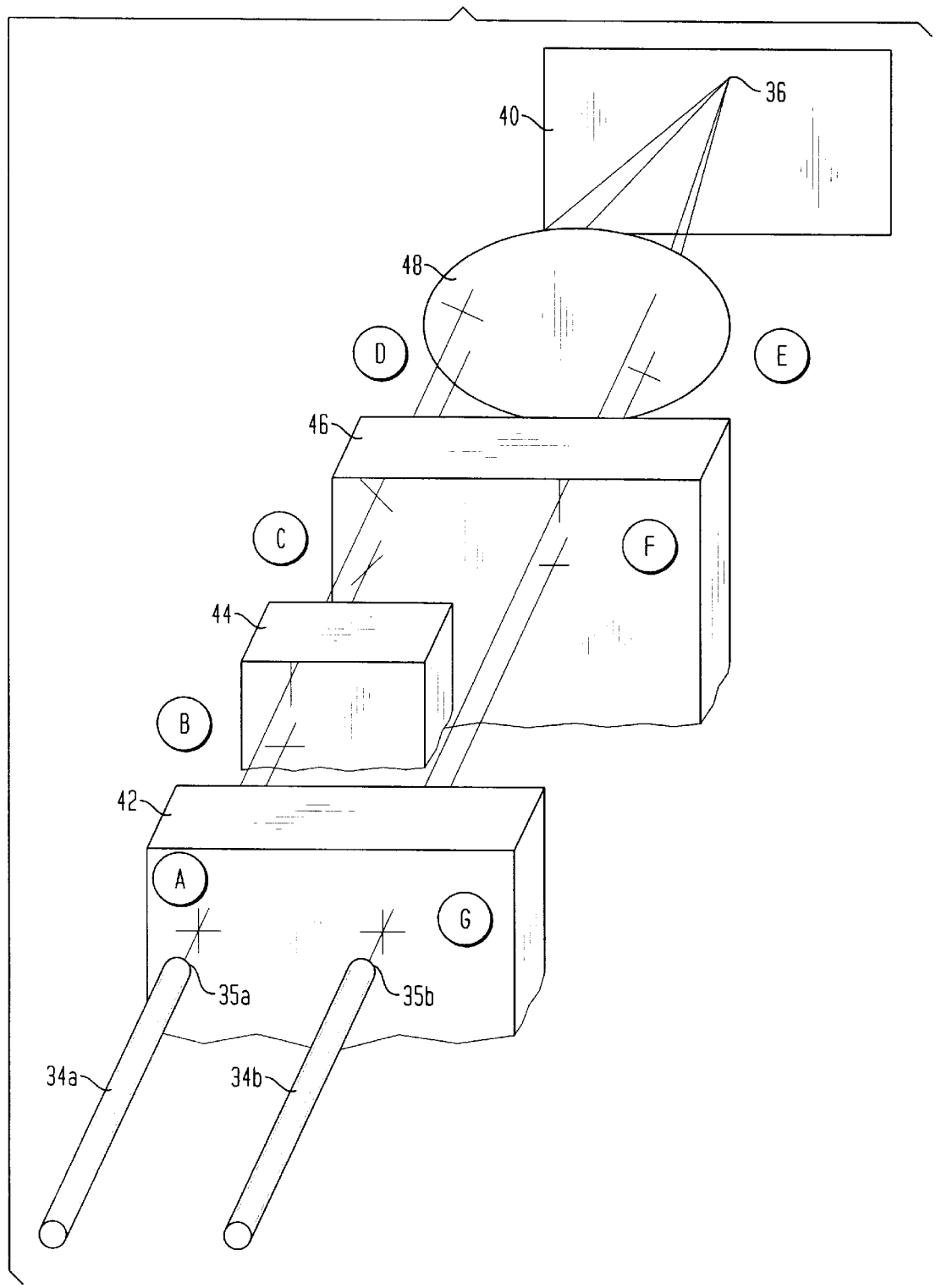
FIG. 3A is a schematic illustration showing anticipated paths of light beams traveling through the isolator of FIG. 2 in the forward (transmission) direction.
Figure 3B:
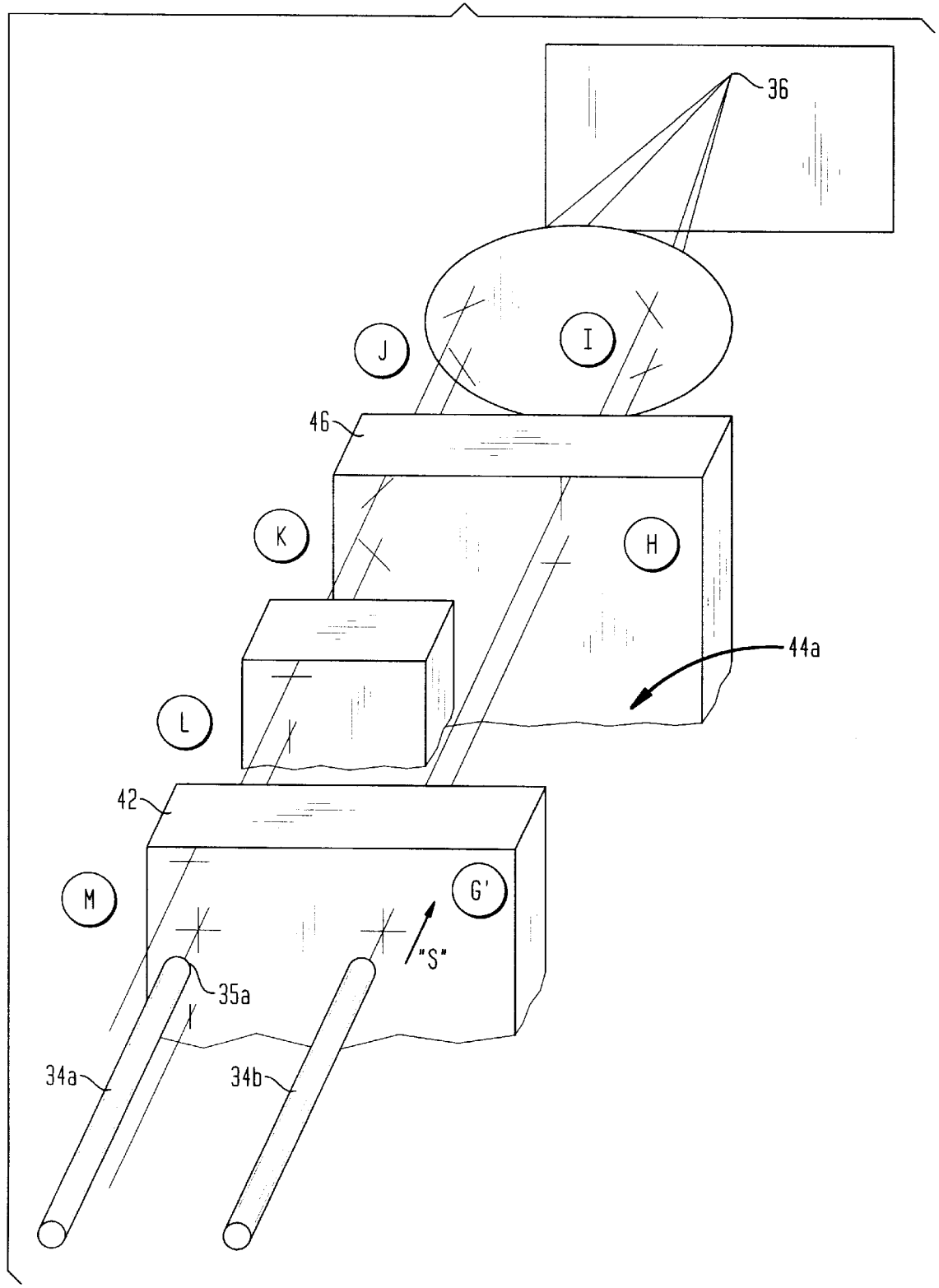
FIG. 3B is a schematic illustration showing anticipated paths of light beams traveling through the isolator of FIG. 2 in the reverse (isolation) direction.

FIGS. 3A and 3B schematically illustrate in more detail the anticipated light paths and relative polarizations of the ordinary and extraordinary rays traveling through the embodiment of the isolator shown in FIGS. 2A–2B. FIG. 3A shows the rays traveling in the transmission direction, and FIG. 3B in the isolation direction. The polarization directions of the two signal paths are illustrated at the various points at which they traverse the isolator with short polarization lines at regions labeled "A" through "M." Notably, FIGS. 3A and 3B are exploded, perspective views provided for the sake of clarity in showing the polarization of the rays, such that it appears that spaces are present between the isolator parts at these positions (i.e., "A" through "M").

As can be seen, input signal I with mixed polarizations, illustrated in FIG. 3A at position "A," exits waveguide 34a at port 35a and enters birefringent slab 42, where the E-ray component of the signal experiences a lateral spatial displacement upward as it traverses the slab 42. The E-ray is orientated 90°, as shown at position "B." (The angles are identified herein with reference to the counterclockwise degree of rotation from a 3 o'clock, e.g., horizontal, axis.) At B, the two paths are parallel but vertically displaced as can be seen with the two lines shown in the figure. The E-ray and O-ray then enter the half-wave plate 44, which functions to effectively rotate the rays in by 45°, in this embodiment in a counter-clockwise direction. The half-wave plate in actuality will flip the polarization of each ray about its fast or slow axis, and thus, to essentially rotate the rays by 45° in the counter-clockwise direction, the axis of the half-wave plate should be at about 22.5° counter-clockwise of one of the incident polarization directions. Upon exiting the half-wave plate, the E-ray polarization is oriented at 135° and the O-ray polarization at 45°, as shown at position "C." The rays then pass through the Faraday rotator 46, which rotates the rays (here in a counter-clockwise direction) by 22.5°, such that the E-ray is oriented at 157.5° and the O-ray at 67.5°, as shown at position "D." Of course, it should be understood that in alternative embodiments the rotation and polarization changes may occur in the opposing, e.g., clockwise, direction.

Upon exiting the Faraday rotator 46, the rays will impinge upon the lens 48, which serves to collimate the beams, focus the beams' centers, and project them upon interconnection or end surface 40, at common region 36. The beams' centers passing through the first three layers of the device (42, 44, 46), travel parallel to one another; the beams are collimated by the lens, but upon passing through the lens 48 in the transmission direction toward the surface 40, they are brought out of parallelism and cross each other on the axis of the lens, as shown. The center of the lens should be disposed approximately at the midpoint of the ordinary path from one waveguide and the extraordinary path of the other waveguide. At common region 36, the beams are reflected back in a reverse orientation. The reflection process causes the rays to be flipped in their physical locations while their polarizations remain the same. Thus, the two beams are again vertically stacked but interchanged as between which beam is oriented in a "high" versus a "low" position (e.g., illustrated on FIGS. 3A and 3B).

Since the Faraday rotator is a non-reciprocal device, the second pass through the rotator (i.e., in the second direction) still results in a second counter-clockwise rotation of 22.5° degrees (e.g., as viewed from the left side of the figure). With the non-reciprocal device, the two rays are affected in essentially the same way irrespective of the direction in which they pass through the device. The term "reciprocal device" means that the two rays of each signal are spatially displaced, polarized, or rotated relative to each other in a first orientation when the rays pass through the device in a first direction and are changed relative to each other in correspondingly opposite orientation when the rays pass through the device in a second direction.

Consequently, as emerging from the Faraday rotator 46 with the second pass as seen at position "F," the ray which originally was the E-ray is at a 0° polarization (e.g., it has been rotated 180°) and the ray which originally was the O-ray is at 90°, so the rays have exchanged polarization states relative to their original orientation. As between positions "B" and "F" of FIG. 3A, the E-ray has changed its polarization to an O-polarized beam, and the O-ray to an E-polarized beam. The birefringent slab 42, or walk-off plate, is a reciprocal device. Thus, on the second pass through the slab 42 (in the second direction), the former E-ray will be unaffected (it is now O-polarized), but the former O-ray (now E-polarized) will experience spatial displacement. The signal is thus recombined, as shown at position "G," and the recombined signal is then launched into output port 35b of waveguide 34b.

In the isolation direction as shown in FIG. 3B, the polarizations do not become interchanged. Illustrated at G', the signal "S" with mixed polarizations exits waveguide 34b and enters birefringent slab 42, where the E-ray component of the signal experiences a vertical spatial displacement as it traverses the slab 42, as shown at position "H" of FIG. 3B. In this direction, upon entering the Faraday rotator 46, the E-ray is oriented at 90° and the O-ray is at 0°, as the rays do not pass the half-wave plate but instead pass through the gap 44a. The rotator rotates each ray 22.5°, here in the counter-clockwise direction, so that the E-ray is at 112.5° and the O-ray is at 22.5°, illustrated with the polarization lines at position "I." The rays pass through the lens 48 and reflect at common region 36, exchanging their physical locations as shown at "J." Upon the second pass through the rotator (in the second direction), each ray is again rotated at 22.5° in a counter-clockwise position, so the E-ray is at 135° and the O-ray is at 45°, shown at position "K." The rays then pass through the half-wave plate, which changes the polarization of the rays by 45.° Thus, upon exiting the half-wave plate, as shown with the lines indicating polarization direction at position "L," the O-ray will be oriented at 0° and the E-ray at 90°. In other words, their polarizations have remained unchanged relative to the point of entry to the isolator. Upon the second pass through the birefringent slab, the O-ray (now along 0°) will be unaffected, but the E-ray (rotated at 90°), will experience spatial displacement. The displacement will be in the opposite direction relative to the first pass, so that the E-ray will walk-off in the negative direction, shown at position "M" of FIG. 3B. The rays are thus separated and will not be launched into the input port 35a of fiber section 34a.

Figure 4:
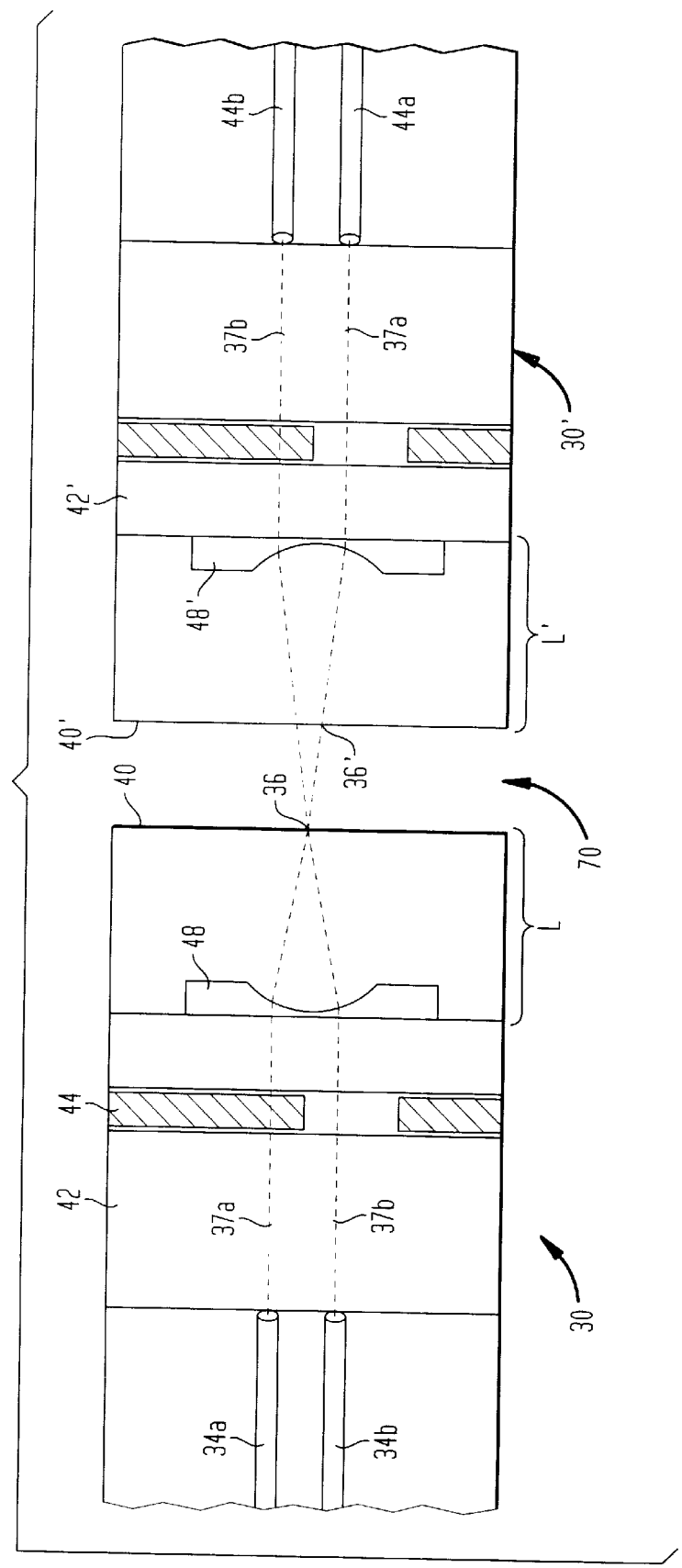
FIG. 4 is a schematic illustration of an alternative embodiment of the inventive optical isolator coupled to a substantially duplicate assembly.

With this inventive optical isolator, a transmissive isolator assembly may be made, as shown in FIG. 4. In particular, the interconnection surface 40 of the first isolator 30 may be AR coated, instead of HR coated, so that the signal transmitted from the section of fiber 34a passes through surface 40 without loss and is coupled to a second, substantially duplicate isolator 30.' The first isolator 30 may be placed on an edge of an integrated optical device, with the second isolator 30'coupled "off chip." Preferably, the thicknesses of the lens-containing layers may differ as between the first and second isolators for aligning the optical signal paths; that is, as shown in FIG. 4, the distance "L" for the lens-containing layer of the substantially duplicate assembly 30' may be reduced relative to the distance "L" of the first isolator. With a reduced thickness for L', the signals 37a, 37b intersect at common region 36 of the first isolator, whereas at the region 36' at the end surface 40' of the second isolator, the signals 37a, 37b are separated. If the thickness L is essentially the same as L', the end surfaces 40, 40' would have to be placed together to align the paths. Thus, reducing the thickness L' relative to L and placing a gap 70 between the isolators aids in aligning the paths. The preferred dimensions for lens-containing layers 50, 50' and the gap 70 are related to the refractive indices of the materials used to fabricate them. For example, preferably, $n_1L \sim n_2G + n_3L'$, where $n_1$, $n_2$, and $n_3$ are the refractive indices of the material comprising the first lens-containing layer 50, the gap 70, and the second lens-containing layer, respectively, and G is the width of the gap 70.

In this way, two transmissive isolators are formed between the four waveguides 34a, 34b, 44a, 44b. The first part of the signal 37a associated with waveguide 34a passes through the first isolator 30, through interconnection surfaces 40, 40', and through the second isolator 30', where it is launched into waveguide 44a. The two isolators 30, 30' block back reflections from passing backward from waveguide 44a into fiber 34a, in the same way as back reflections are blocked from passing backward from waveguide 34b to waveguide 34a of FIGS. 2, 3A–3B. Similarly, the signal 37b of waveguide 34b passes through the first and second isolators 30, 30' and is launched into waveguide 44b, and the isolators block back reflections from passing backward from waveguide 44b into fiber 34b. Waveguides 44a, 44b associated with the second isolator 30' also may belong to another integrated optical circuit.

The inventive technology supports the addition of optical isolators to optical circuits, and it is helpful in solving problems relating to (1) folding of the circuit at edges of the chip (it is difficult to change the major direction of guided light in a small space elsewhere), and (2) the making of optical connections, i.e., it makes the alignment or precision of connections "off-chip" less critical. Additionally, the HR coating on the interconnection surface may be replaced with beam-splitting coatings as a means for providing optical taps to monitor the performance of the circuit.

The invention provides a simplified construction that can lead to cost reduction, and it is beneficial with regard to alignment issues. Traditionally, most isolator assemblies have been actively aligned. This requirement is eased for an array of isolators according to the invention because as previously described with reference to FIG. 4 isolator assemblies can be coupled and waveguide paths connected without pressing end surfaces 40, 40' together which would reduce the tolerance of the alignment. The coupling of the assemblies is less critical than with the butt-coupling of two integrated optical circuits, because the beams passing through the device are collimated with relatively large beam cross-sections (compared to mode cross-sections of individual waveguides). Passive alignment is made possible because mechanical features can be lithographically defined to partially or totally restrict the registration process. Such mechanical features could comprise raised or depressed elements (e.g., "pegs" configured to fit into corresponding "holes"), or linear features ("raised lines" and "slots"), or other similar elements known for registering parts. One or more "rods" could be used to maintain alignment between a plurality of layers, wherein the layers each have holes in them for the rods to pass through. For integrated optical circuits on crystalline silicon wafers, etched V-grooves may be lithographically defined relative to the optical waveguides. As previously discussed, a "sandwich of layers" may be formed and then sliced to form a plurality of isolators.

Figure 5A:
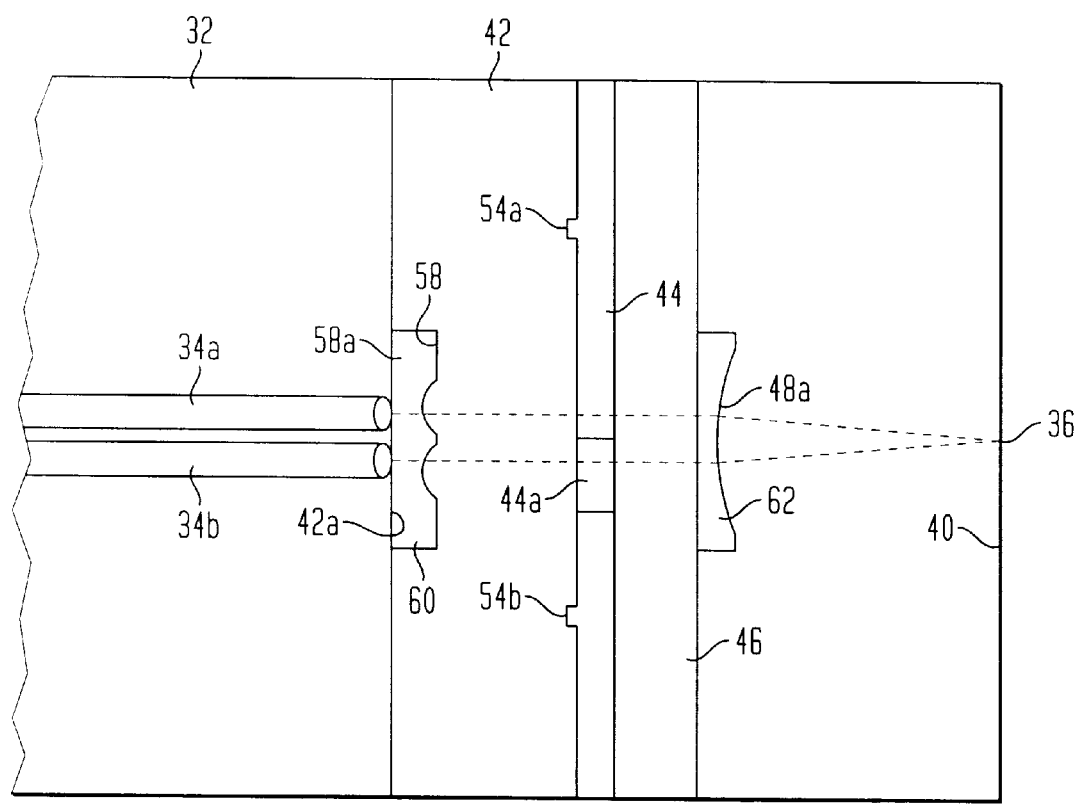
FIGS. 5A, 5B and 5C are schematic illustrations of alternative embodiments of the inventive optical isolator that comprise lithographically-defined mechanical registration features.
Figure 5B:
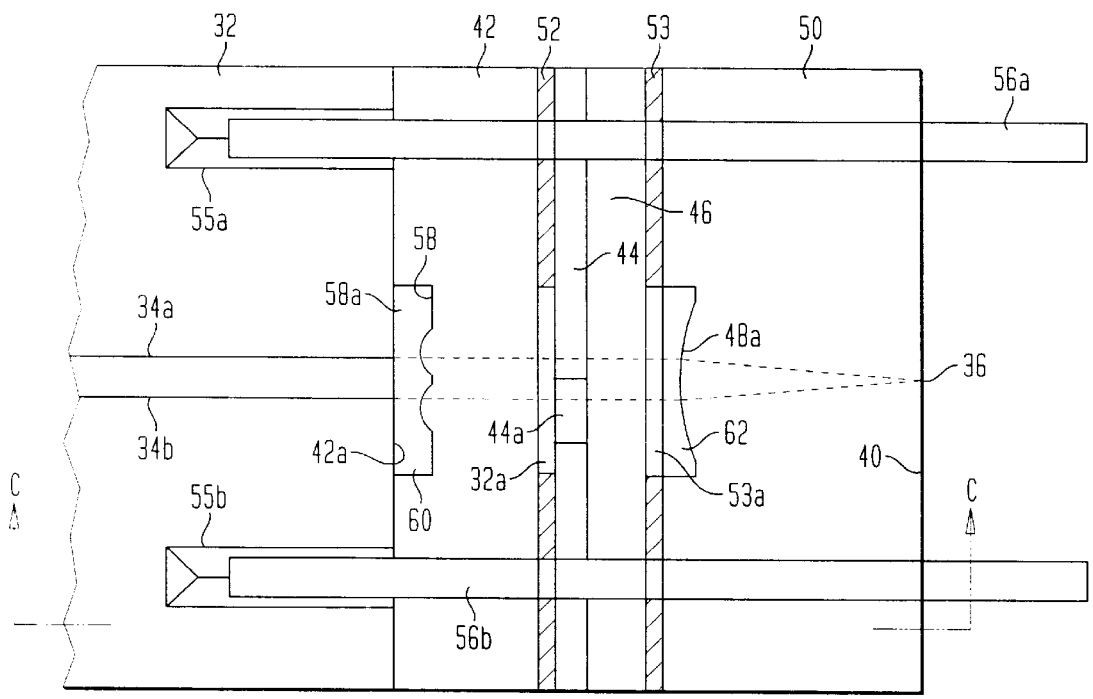
Figure 5C:
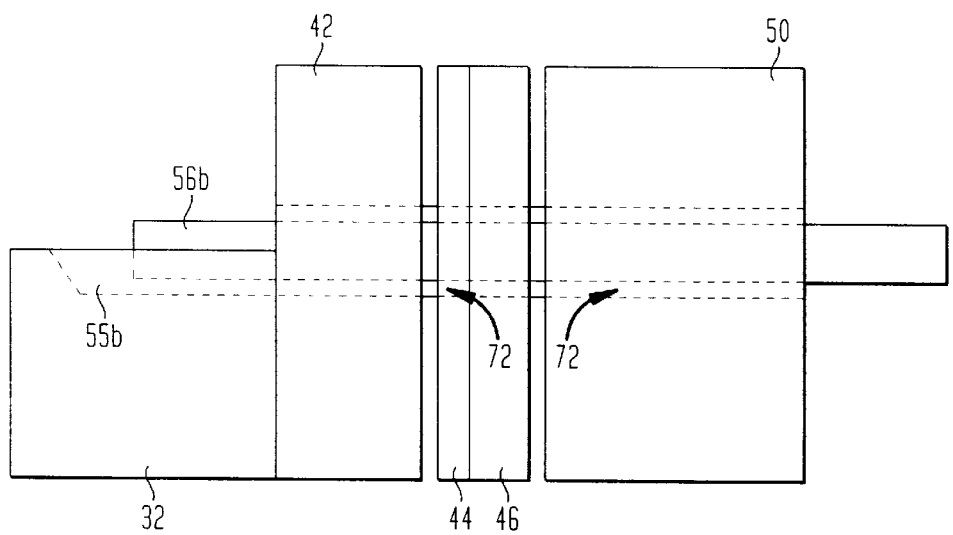

FIGS. 5A, 5B, and 5C are schematic diagrams showing mechanical alignment features, with like character references used to denote like features as in FIGS. 2, 3A and 3B. In FIGS. 5A–5C, an additional lens 58 is added adjacent the region bounding the substrate 32 containing waveguides 34a, 34b, and the first birefringent slab 42. This lens 58 may be beneficial for reducing the fanning out of the rays 37a, 37b, emitted from the waveguides 34a, 34b, and for maintaining separation of the rays in the region of the halfwave plate 44. Also, the lens surfaces 48a, 58a preferably are recessed from the edge of the adjacent layer (e.g., surface 58a is recessed from edge 42a). The efficacy of the lens 58 is improved if there is spacing between the ends of waveguides 34a, 34b, and lens 58. Recessing the lens surfaces is helpful for preventing accidental scuffing of the surfaces in the region of the light transmission paths. It is expected in practice that the lens containing surfaces may have possible airgaps 60, 62 to accommodate the lenses and that the layer surfaces adjacent such gaps (e.g., surfaces of the lens-containing layers and the corresponding surfaces of contiguous layers), will have AR coatings to minimize reflections and maximize transmission.

FIG. 5A shows an embodiment where pegs 54a, 54b protrude from the half-wave plate 44 and fit into corresponding slots in the first birefringent slab 42. In FIGS. 5B–C, etched V-grooves 55a, 55b are lithographically defined in the substrate 32, essentially parallel to the optical waveguides 34a, 34b, and holes 72 are placed in the isolator parts to contain alignment rods 56a, 56b. FIG. 5C shows a cross-sectional side view of the rod feature of the embodiment of FIG. 5B (FIG. 5B showing a top view), taken along the line C—C of FIG. 5B. Notably, since the cross-section in FIG. 5C is taken along the line C—C which is along a side of (instead of traversing) the alignment rod 56b, in FIG. 5C the rod and etched groove 55b are shown with dashed lines to denote these features are hidden from view. Alignment rods 56a, 56b, are supported within the etched V-grooves and pass through holes in each of the layers comprising the birefringent slab 42, the half-wave plate 44, the Faraday rotator 46, and the lens-containing layer 50. The rods 56a, 56b, may protrude outward from the end surface 40 for alignment with a duplicate assembly (FIG. 4). Epoxy or glue may be used to bond the layers together. A low viscosity adhesive should be used, which will easily wick or slide uniformly between the layers where the surfaces are in close proximity.

Surface tension may be used in bonding the layers to reduce the likelihood that the adhesive will wick onto surfaces within the gaps 44a, 60, 62, which would degrade the optical performance. Additionally, for reliability reasons, it is preferable to avoid having organics such as epoxy or other adhesives within the optical path, e.g., following dashed lines 37a, 37b of FIGS. 5A, 5B. To prevent the adhesive from wicking into the region of the optical path, the face surfaces of adjoining layers may be etched back so that spaces are present between the layers at the region of the optical path, taking into consideration that the thicknesses of the half-wave plate and Faraday rotator should be controlled so that they will provide the desired polarization changes and rotations, previously discussed. Preferably, the separated surfaces are AR coated to minimize reflections and maximize transmission. Alternatively to etching back the layers, as schematically shown in FIG. 5B, additional layers 52, 53 may be added to act as spacers, wherein the spacer layers have perforations or gaps 52a, 53a, in the region of the optical path. Again, it must be ensured that the proper thicknesses for the layers of the isolator are maintained for the desired rotations.

Figure 6:
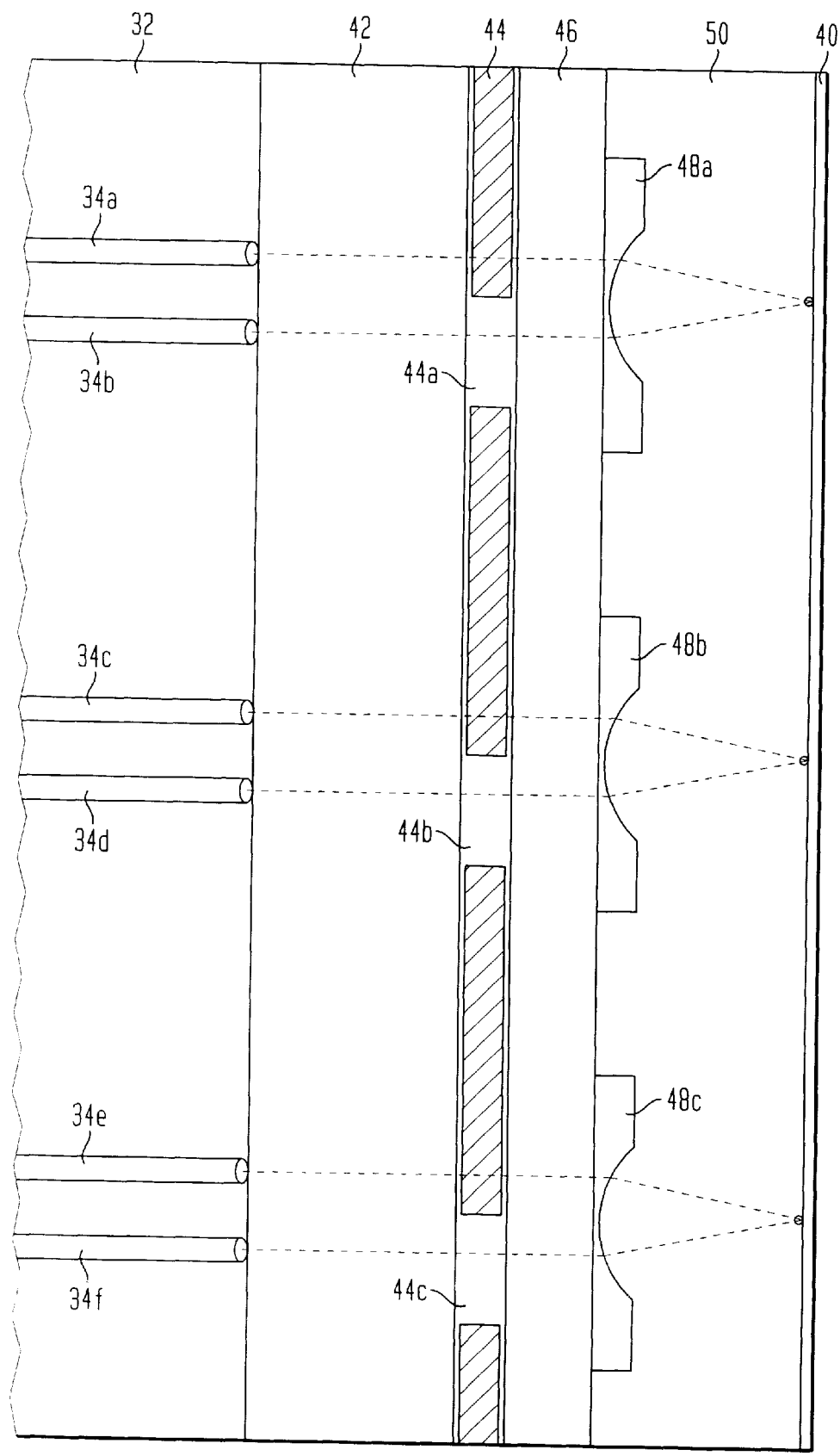
FIG. 6 is a schematic illustration of an embodiment of the inventive isolator comprising a plurality of disposed in parallel.

It should be clear that the inventive isolator may comprise an array, e.g., a plurality of isolators disposed in parallel by incorporation of a plurality of certain features. For example, as illustrated in FIG. 6, one could incorporate a plurality of waveguide pairs (e.g., 34a, 34b, 34c, 34d, 34e, 34f), a plurality of gaps in the one-half wave plate (44a, 44b, 44c) and a plurality of lenses (48a, 48b, 48c). The relative spacings between the waveguides and the device features could be easily maintained using lithographic techniques during assembly of each layer containing these features.

It is understood that the embodiments described herein are merely exemplary and that a person skilled in the art may make variations and modifications without departing from the spirit and scope of the invention. All such variations and modifications are intended to be included within the scope of the appended claims.

We claim:

1. A device comprising an optical isolator for preventing back reflection in the path of an optical signal having two parts, the isolator comprising a sandwich of layers comprising a walk-off plate, a reciprocal half-wave plate, a non-reciprocal rotator plate and a lens-containing plate, each of said plates having contiguous face surfaces including lithographically defined raised or depressed elements to align successive plates:

the walk-off plate disposed along the optical path for separating each of the two parts of the signal into two spacially displaced rays;

the reciprocal half-wave plate disposed along the optical path adjacent the walk-off plate, the half-wave plate designed to produce polarization conversion of the two rays of one part of the signal by a pre-determined angle when the rays pass therethrough, the half-wave plate further having a gap to allow the rays of the other part of the signal to pass therethrough without change;

the non-reciprocal rotator plate disposed adjacent the half-wave plate and oppositely disposed to the walk-off plate, the rotator plate comprised of material designed to produce Faraday rotation of the first and second rays of each of the two parts of the signal by a predetermined angle;

the lens-containing plate adjacent the non-reciprocal rotator plate opposite the half-wave plate, the lens-containing plate having an end surface with a common intersection region, wherein a lens is disposed in the lens-containing plate between the non-reciprocal rotator plate and the end surface for collimating the two parts of the signal as the signal is transmitted through the walk-off plate, the half-wave plate, and the rotator plate, and for focusing the two parts of the signal so they are coupled at the common intersection region.

2. The device of claim 1, further comprising first and second waveguides for radiating the optical signal into the walk-off plate, one of the two parts of the optical signal being associated with the first waveguide and the other of the two parts of the signal being associated with the second waveguide.

3. The device of claim 2, in which the direction of the optical path from the first waveguide to the second waveguide defines a transmission direction and the direction of the optical path from the second waveguide to the first waveguide defines an isolation direction, wherein when the optical signal follows the transmission direction, the signal is physically separated into two displaced rays and then recombined to be launched into the second waveguide, but when the optical signal follows the isolation direction, the signal is physically separated into two rays but not recombined so the signal is not launched into the first waveguide and is thereby isolated.

4. The device of claim 2, in which the first and second waveguides comprise a pair of optical fibers.

5. The device of claim 2, in which the first and second waveguides comprise two planar waveguides disposed on a substrate.

6. The device of claim 1 in which the end surface is coated to define a highly-reflective surface for interconnection of the two parts of the signal by reflection.

7. The device of claim 1 in which the end surface is coated to define an anti-reflective surface for interconnection of the two parts of the signal by transmission.

8. The device of claim 7, in combination with a substantially duplicate isolator for coupling of the signal to an optical circuit device.

9. The device of claim 1, in which the walk-off plate is fabricated with a uniaxial material selected from calcite and rutile.

10. The device of claim 1, in which the half-wave plate is fabricated with a material selected from quartz and mica.

11. The device of claim 1, in which the half-wave plate is designed to produce polarization changes in the first and second rays of one of the two parts of the signal by about forty-five degrees.

12. The device of claim 1, in which the non-reciprocal rotator is a Faraday rotator fabricated from garnet.

13. The device of claim 12, in which the Faraday rotator is designed to produce rotation of the polarization of the first and second rays of each of the two parts of the signal by about 22.5 degrees.

14. The device of claim 1, in which the optical elements are produced by lithographically defined means.

15. The device of claim 1, in which each one of the adjoining layers has at least one hole passing therethrough, the at least one hole of each layer being in communication with a hole of an adjoining layer, and the optical path for transmission of the signal is aligned between the adjoining layers by disposing an alignment rod within the holes of each of the adjoining layers.

16. An optical communications system comprising the device of claim 1.

17. An optical communications system comprising an array of isolators according to claim 1.

18. The device of claim 1 wherein the successive adjoining plates of the sandwich of layers are bonded together.

* * * * *